US006588010B1

(12) United States Patent
Ogata

(10) Patent No.: US 6,588,010 B1
(45) Date of Patent: Jul. 1, 2003

(54) COMPUTER SYSTEM AND METHOD OF MODIFYING PROGRAM IN THE COMPUTER SYSTEM

(75) Inventor: Hitoshi Ogata, Sakai (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/280,690

(22) Filed: Mar. 30, 1999

(30) Foreign Application Priority Data

Mar. 31, 1998 (JP) .......................................... 10-086002

(51) Int. Cl.⁷ .............................................. G06F 9/445
(52) U.S. Cl. ....................... 717/169; 717/168; 714/764; 714/768
(58) Field of Search ................................. 711/102, 103, 711/104; 714/768, 763, 764, 758; 717/168, 169

(56) References Cited

U.S. PATENT DOCUMENTS

| 4,542,453 A | * | 9/1985 | Patrick et al. ................... 714/8 |
| 5,367,658 A | * | 11/1994 | Spear et al. ................. 711/163 |
| 5,471,045 A | * | 11/1995 | Geronimi ..................... 235/492 |
| 5,542,081 A | * | 7/1996 | Geronimi ..................... 712/37 |

FOREIGN PATENT DOCUMENTS

| EP | 0 092 646 A | | 11/1983 | |
| FR | WO-98/57255 | * | 12/1998 | ............. G06F/9/32 |
| JP | 03 269726 A | | 12/1991 | |
| JP | 04090032 A | | 3/1992 | |
| JP | 05143316 | | 6/1993 | |
| JP | 06-342412 A | | 12/1994 | |
| JP | 07-084775 A | | 3/1995 | |

OTHER PUBLICATIONS

Breternitz Jr. et al., "Enhanced Compression Techniques to Simplify Program Decompression and Execution", IEEE, pp. 170–176, Oct. 1997.*
Momodomi et al., "A 4Mb NAND EEPROM with Tight programmed Vt distribution", IEEE, pp. 492–496, Apr. 1991.*
IBM Technical disclosure Bulletin, "Dual Indirect Ram/Rom Jump Tables for Firmware Updates", vol. 31, No. 1, pp. 294–298, Jun. 1988.*
Melear, "Integrated memory elements on microcontroller devices", IEEE, pp. 507–514, Sep. 1994.*

(List continued on next page.)

Primary Examiner—Gregory Morse
Assistant Examiner—Ted T. Vo
(74) Attorney, Agent, or Firm—Armstrong, Westerman & Hattori, LLP

(57) ABSTRACT

A computer system comprises a microcomputer and external memory means in communication with the microcomputer for storing various programs and various items of data. The microcomputer comprises a nonerasable ROM having stored therein a basic program and basic data indispensable to the operation of the system, a RAM for storing various programs or various kinds of data, a CPU for executing programs and processing data, and an interface circuit for providing communications with external devices. The external memory means has stored therein a modification program for modifying a portion of program data contained in the basic program, and a modification starting address indicating a location in the basic program where the modification of the basic program by the modification program is to be started. The CPU has an address interrupt function for processing an interrupt at a predetermined interrupt address. The microcomputer modifies the basic program by transferring the modification program from the external memory means to the RAM, storing the modification starting address in the CPU as the interrupt address, and executing a command to jump to a head address of the modification program in the RAM for an address interrupt.

15 Claims, 11 Drawing Sheets

OTHER PUBLICATIONS

"Replacement of Deflective Control Store Routines. Apr. 1983." IBM TECHNICAL DISCLOSURE BULLETIN, vol. 25, No. 11B, p. 6187.

"Dynamic Patch for Read Only Storage Program. Mar. 1974." IBM TECHNICAL DISCLOSURE BULLETIN, vol. 16, No. 10, p. 3362.

* cited by examiner

COMPUTER SYSTEM AND METHOD OF MODIFYING PROGRAM IN THE COMPUTER SYSTEM

FIELD OF THE INVENTION

The present invention relates to a method of modifying a program stored in a nonerasable ROM (read-only memory) and executing the modified program for use in computer systems.

BACKGROUND OF THE INVENTION

Computer systems generally comprise a microcomputer serving as the main component, and an external device connected to the microcomputer. The microcomputer consists essentially of memory means for storing programs and data, a CPU (central processing unit) for reading the program and data from the memory means, executing the program and processing the data, and an interface (I/F) circuit for providing communications with the external device.

The memory means comprises a ROM having stored therein the basic program and basic data indispensable to the operation of the computer system and to be executed or processed, for example, upon a start-up, and a RAM (random access memory) for storing various programs and various kinds of data. A nonerasable masked ROM is usually used as the ROM, which therefore has the problem that the basic program and basic data stored in the masked ROM cannot be modified.

The following methods are available of modifying the basic program and basic data to solve this problem. An erasable nonvolatile external memory device, such as EEPROM, is connected to the microcomputer, with a modified basic program and modified basic data stored in the device. When executing the basic program and processing the basic data, the microcomputer lets the modified basic program and the modified basic data be transferred from the external memory device to the RAM for execution or processing.

This method is effective when the basic program to be modified contains a small quantity of data. However, when a basic program containing a large quantity of data is to be modified, the basic program occupies an excessively great region of the RAM to impair the processing ability of the microcomputer.

As another method of modifying the basic program, the external memory device has stored therein modification program data (hereinafter referred to as the "modification program") for modifying a portion of program data contained in the basic program. Before executing the basic program, the microcomputer transfers the modification program from the external memory device to the RAM, and when executing the portion to be modified of the basic program, the microcomputer executes the modification program, with the result that the basic program is executed as modified.

With this method, the modification program, which corresponds to a portion of the basic program, is transferred to the RAM and is therefore unlikely to occupy an excessive region. In the case of this method, the microcomputer has stored therein a modifying address indicating the location where the data contained in the basic program is to be modified, and a RAM address where the data of the modification program to be substituted at the modifying address is stored. When executing the basic program, the microcomputer needs to modify the basic program always with reference to the modifying address and the RAM address. This impairs the processing ability of the microcomputer.

JP-A No. 143316/1993 discloses a method of partially modifying programs, which is another method of modifying the basic program. FIG. 11 shows the interior construction of a microcomputer for use in practicing this method. As illustrated, the microcomputer 90 has a CPU 91, masked ROM 92, RAM 93 and I/F circuit 98 which are previously mentioned, and further comprises a modification program memory 95 for storing a modification program and an address storage 95 for storing a modifying address. The microcomputer further includes a change-over circuit 97 which upon receiving the modifying address from the storage 96, changes over the basic program from the masked ROM to the modification program from the memory 95 and transmits the modification program to the CPU 91. The devices 91, 92, 93, 95, 96, 97, 98 are connected by a bus 94.

When the CPU 91 reads the basic program from the masked ROM 92 for execution and if an address of the basic program to be read by the CPU 91 matches the modifying address, the change-over circuit 97 transmits the modification program from the memory 95 to the CPU 91, whereby the basic program is modified.

This method realizes the modification of the basic program by hardware and therefore entails no delay in executing the basic program, permitting the microcomputer 90 to exhibits its processing ability without impairment. However, the method requires the addition of the modification program memory 95, modifying address storage 96 and change-over circuit 97 to the microcomputer 90, rendering the computer 90 greater in size.

The present inventor has devised the following means for solving the foregoing problems encountered in modifying the basic program, directing attention to the address interrupt function provided for CPUs. This function is such that when the CPU specifies a predetermined address, an interrupt is processed. Presently many CPUs have this interrupt function.

SUMMARY OF THE INVENTION

An object of the present invention is to provide a computer system wherein the basic program can be modified without making the microcomputer incorporated therein large-sized and without impairing the processing ability of the microcomputer.

The present invention provides a computer system comprising a microcomputer and external memory means in communication with the microcomputer for storing various programs and various items of data, the microcomputer comprising a nonerasable ROM having stored therein a basic program and basic data for controlling the operation of the computer system, a RAM for storing various programs or various kinds of data, a CPU for executing programs and processing data, and an interface circuit for providing communications with external devices. The external memory means has stored therein a modification program for modifying a portion of program data contained in the basic program, and a modification starting address indicating a location in the basic program where the modification of the basic program by the modification program is to be started. The CPU has an address interrupt function for processing an interrupt at a predetermined interrupt address.

In the computer system thus constructed, the microcomputer transfers the modification program from the external memory means to the RAM and stores the modification starting address in the CPU as the interrupt address. When an address interrupt occurs upon the CPU specifying the modification starting address during the execution of the basic program, the CPU processes the interrupt by causing the basic program to jump to the head address of the modification program in the RAM, and executes the modification program. Consequently, the basic program is modified by the modification program.

The present invention only utilizes a CPU having an address interrupt function, has no need to add another device to the microcomputer for modifying the basic program and accordingly involves no likelihood of making the microcomputer greater in size.

Since the basic program is modified by processing an address interrupt, there is no need for the CPU to refer to the modifying address at all times, consequently precluding impairment of the microcomputer processing ability.

DETAILED DESCRIPTION OF THE INVENTION

An embodiment of the present invention will be described below.

Figure 1:
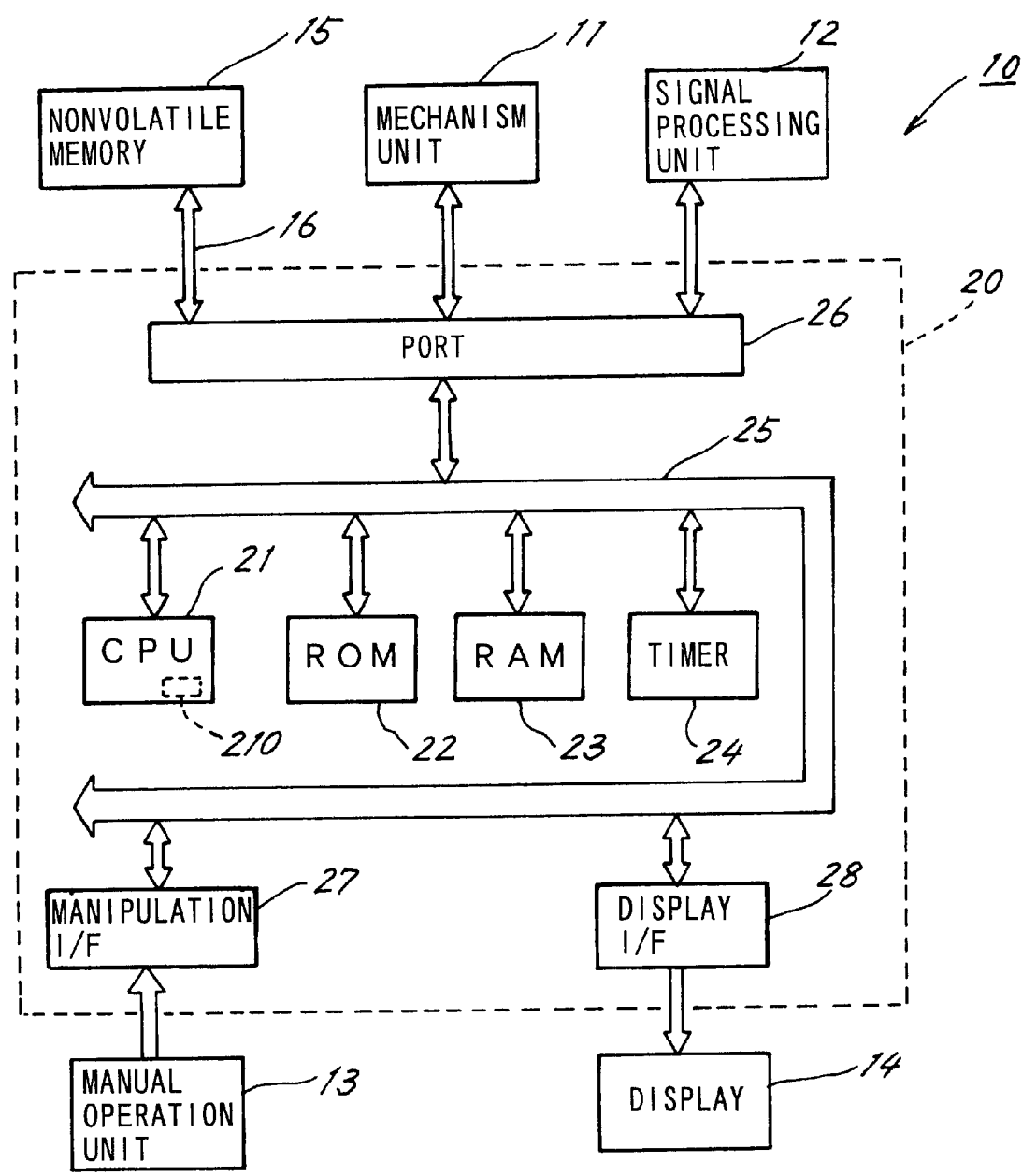
FIG. 1 is a block diagram showing the construction of a disk player embodying the invention.

FIG. 1 is a block diagram showing a system wherein the invention is utilized for controlling the recording and reproduction of signals by a disk player 10. However, the invention is applicable not only to the disk player but also to other computer systems.

The disk player 10 comprises a mechanism unit 11 for reading signals from or writing signals to recording disks such as compact disks, a signal processing unit 12 for processing signals, a manual operation unit 13 to be manipulated by the user, and a display 14 for showing the operating state of the disk player 10.

The disk player 10 further comprises a nonvolatile memory 15 for storing parameters required for the operation of the disk player 10. The memory 15 has stored therein the modification programs and modified data to be described below. An EEPROM of 256 bytes is used as the nonvolatile memory 15 in the present embodiment, and a remaining capacity of about 150 bytes serves to store the modification programs and modified data.

These mechanism unit 11, signal processing unit 12, manual operation unit 13, display 14 and nonvolatile memory 15 are connected to a control microcomputer 20.

The microcomputer 20 includes a CPU 21, a ROM 22 having a basic program and basic data stored therein, a RAM 23 for storing various programs and various kinds of data, and a timer 24 for measuring a predetermined period of elapsed time, which are connected by a bus line 25. The mechanism unit 11, signal processing unit 12 and nonvolatile memory 15 described are connected to the bus line 25 via ports 26. The manual operation unit 13 and the display 14 are connected to the bus line 25 via a manipulation I/F (interface) 27 and a display I/F 28, respectively.

The CPU 21 has an address interrupt function such that CPU processes an interrupt upon specifying a predetermined address, and includes a storage 210 for storing a plurality of interrupt addresses.

When the disk player 10 thus constructed is started up, the microcomputer 20 executes the basic program in the ROM 22 and processes the basic data in the ROM 22 and various parameters in the nonvolatile memory 15. Subsequently when the user manipulates the manual operation unit 12, giving the disk player 10 a command for playback, the microcomputer 20 drives the mechanism unit 11, reads a record signal from the recording disk and outputs the read signal as converted to a predetermined signal form by the signal processing unit 12, in response to the resulting command signal from the manual operation unit 13. Alternatively if the user manipulates the manual operation unit 13 to give a command for recording, the microcomputer 20, responsive to the resulting signal from the manual operation unit 13, converts an input signal to a record signal by the signal processing unit 12, drives the mechanism unit 11 and writes the record signal to the recording disk. During the operation of the disk player 10, the microcomputer 20 transmits a display signal to the display 14, notifying the user of the operating state on the display 14.

Method of Modifying the Basic Program

A description will be given of a method of modifying the basic program of the disk player 10 according to the present invention.

Figure 2:
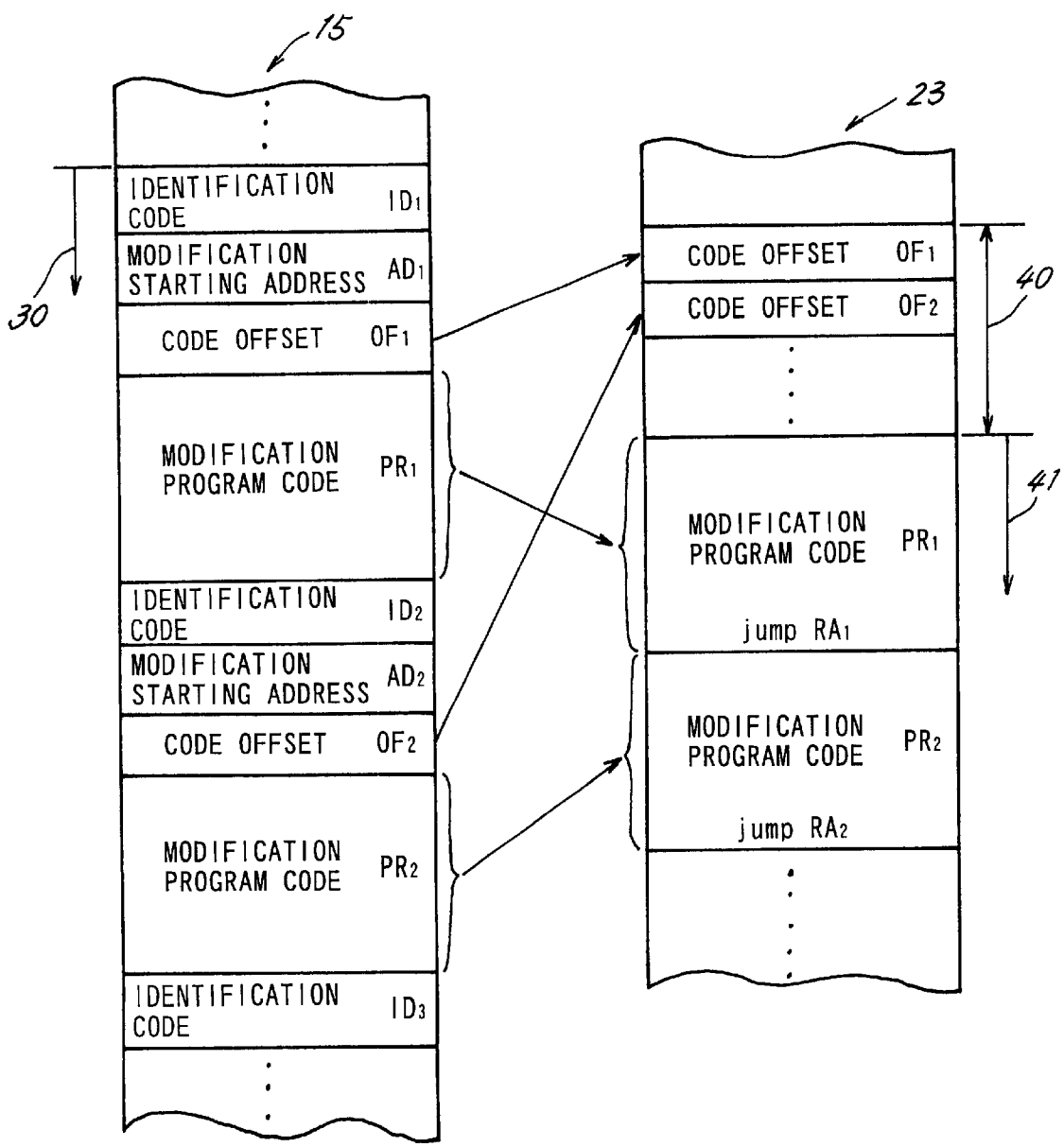
FIG. 2 shows memory maps of a nonvolatile memory and a RAM showing modification programs and data related thereto which are stored in the nonvolatile memory and to be transferred to the RAM.

FIG. 2 shows modification programs and the data related thereto which are stored in the nonvolatile memory 15 and which are to be transferred to the RAM 23. The modification programs and the data related thereto are stored in a modification program storage 30 of the nonvolatile memory 15 in order. In the illustrated case, two modification programs and the data related thereto are stored.

The modification programs and the related data are stored in a predetermined order. The illustrated contents of the storage are arranged in the order of an identification code $ID_i$ (wherein i is an integer of not smaller than 1) indicating whether the modification program exits, a modification starting address $AD_i$ indicating a location in the basic program where the modification of the basic program by the modification program is to be started, a code offset $OF_i$ indicating the code length of the modification program, and a modification program code $PR_i$. Stored at the end of the code $PR_i$ is the code of a command for a jump to a return address $RA_i$ indicating the location in the basic program where the execution of the basic program is to be resumed.

Provided in the RAM 23 are an offset storage 40 for storing the code offset to be transferred from the nonvolatile memory 15, and a program storage 41 for storing the modification program code to be transferred from the memory 15.

Figure 3:
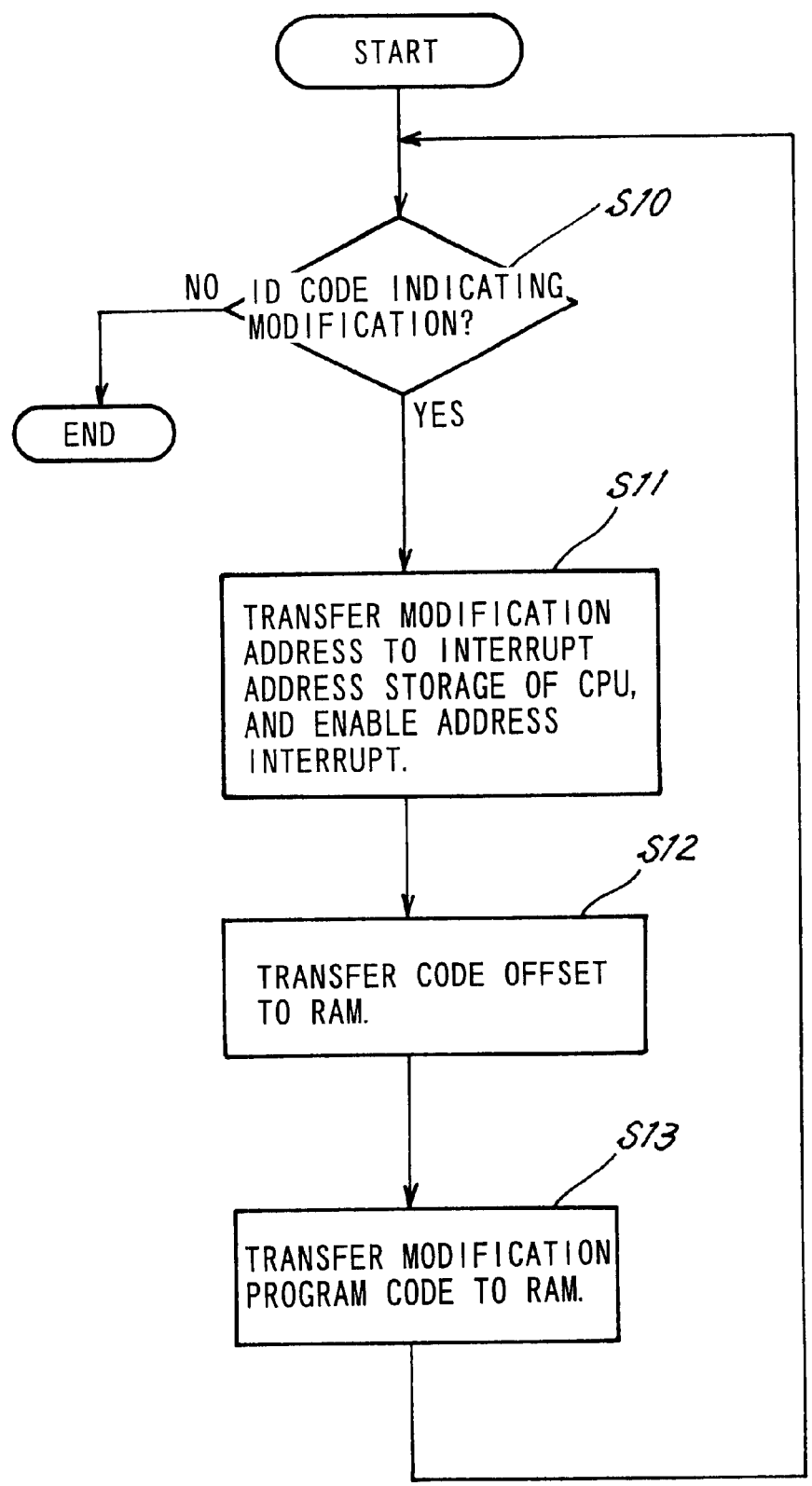
FIG. 3 is a flow chart showing a program for transferring the modification programs and the related data from the nonvolatile memory to the RAM or the like by a CPU.

FIG. 3 is a flow chart showing a program for the CPU 21 to execute when transferring the modification programs and related data from the nonvolatile memory 15 to the RAM 23 or the like. The transfer program is contained in the basic program and executed upon the start-up of the system.

First, the identification code $ID_i$ is read from the memory 15 to check whether the modification program is stored therein (S10). In the absence of the program, the transfer program is terminated. In the presence of the program, the modification starting address $AD_i$ is read from the memory 15 and transferred to the interrupt address storage 210 in the CPU 21, enabling an address interrupt by the address $AD_i$ (S11). Next, the code offset $OF_i$ is transferred from the memory 15 to the offset storage 40 in the RAM 23 (S12). The modification program code $PR_i$ is subsequently transferred from the memory 15 to the program storage 41 in the RAM 23 (S13), whereupon the sequence returns to step S10.

The transfer program is executed by the operation to be described below more specifically with reference to FIG. 2. Initially, the first identification code $ID_1$ is read. Since the first code $ID_1$ contains data indicating that the first modification program is stored, the first modification starting address $AD_1$ is transferred from the memory 15 to the interrupt address storage 210 of the CPU 21 and is allowed as the first interrupt address for an address interrupt. Next, the first code offset $OF_1$ is read and transferred to the offset storage 40 in the RAM 23. The first modification program code $PR_1$ is also read and transferred to the program storage 41 in the RAM 23.

Subsequently, the second identification code $ID_2$ is read. Since the second code $ID_2$ contains data indicating that the second modification program is stored, the second modification starting address $AD_2$ is transferred from the memory 15 to the interrupt address storage 210 of the CPU 21 and allowed as the second interrupt address for an address interrupt. Next, the second code offset $OF_2$ is read and transferred to the offset storage 40 in the RAM 23. The second modification program code $PR_2$ is also read and transferred to the program storage 41 in the RAM 23.

Next, the third identification code $ID_3$ is read. In the case where the third code $ID_3$ contains data indicating that the third modification program is not stored, the transfer program is terminated.

The procedure for modifying the basic program by the modification program will be described below.

Figure 4:
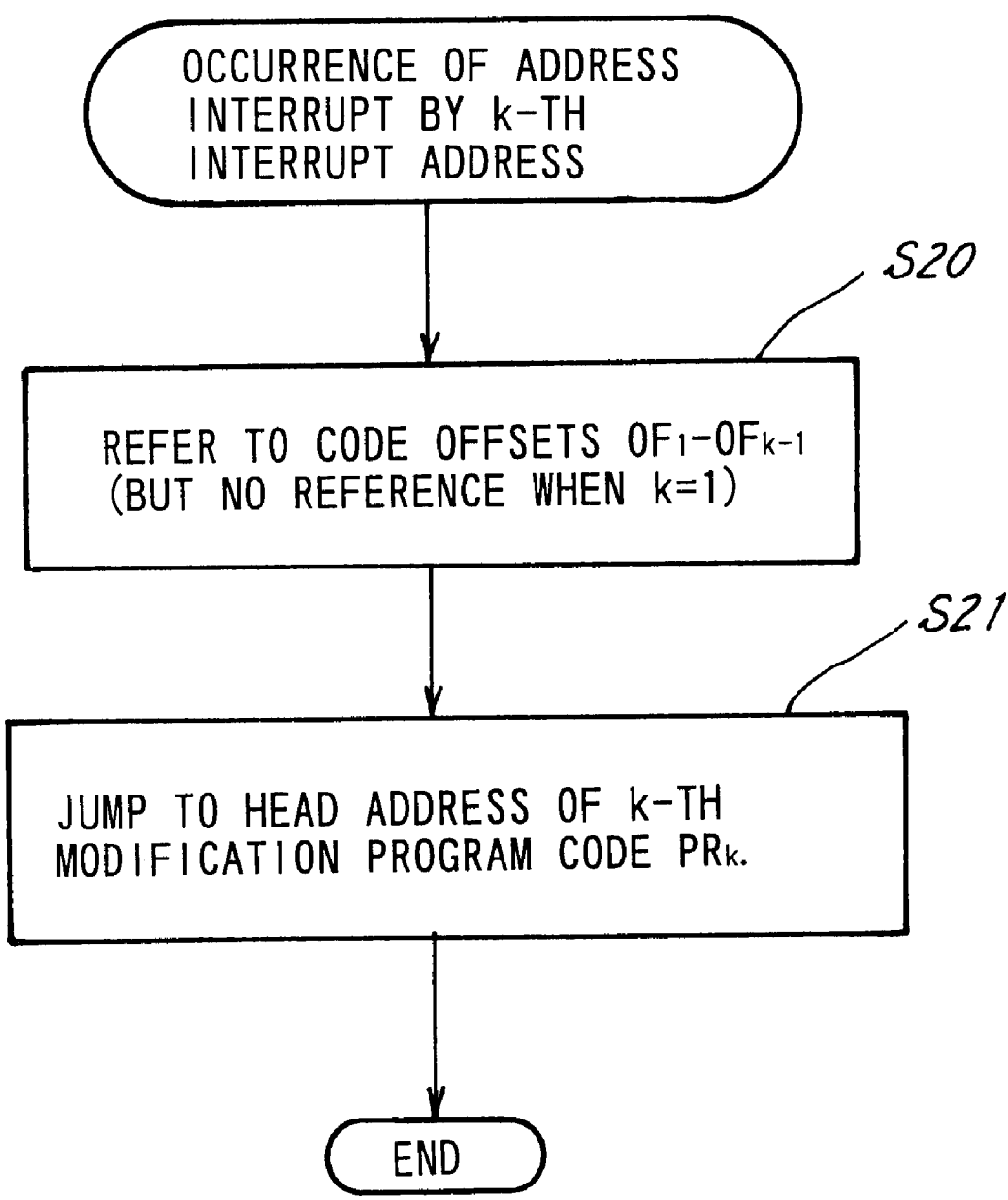
FIG. 4 is a flow chart showing an address interrupt program to be executed when an address interrupt occurs.

FIG. 4 is a flow chart showing the address interrupt program to be executed when an address interrupt occurs. When an address interrupt occurs by the k-th (wherein k is an integer of not smaller than 1) interrupt address, reference is made to code offsets $OF_1$ to $OF_{k-1}$ stored in the offset storage 40 in the RAM 23 (S20). This specifies the head address of the k-th modification program code $PR_k$ stored in the program storage 41 in the RAM 23. In the case where k is 1, the first modification program code $PR_0$ is stored in the head location of the program storage 41, so that no code offset is referred to. Subsequently executed is a command for a jump to the head address of the modification program code $PR_k$ (S21), whereupon the interrupt program is terminated.

Figure 5:
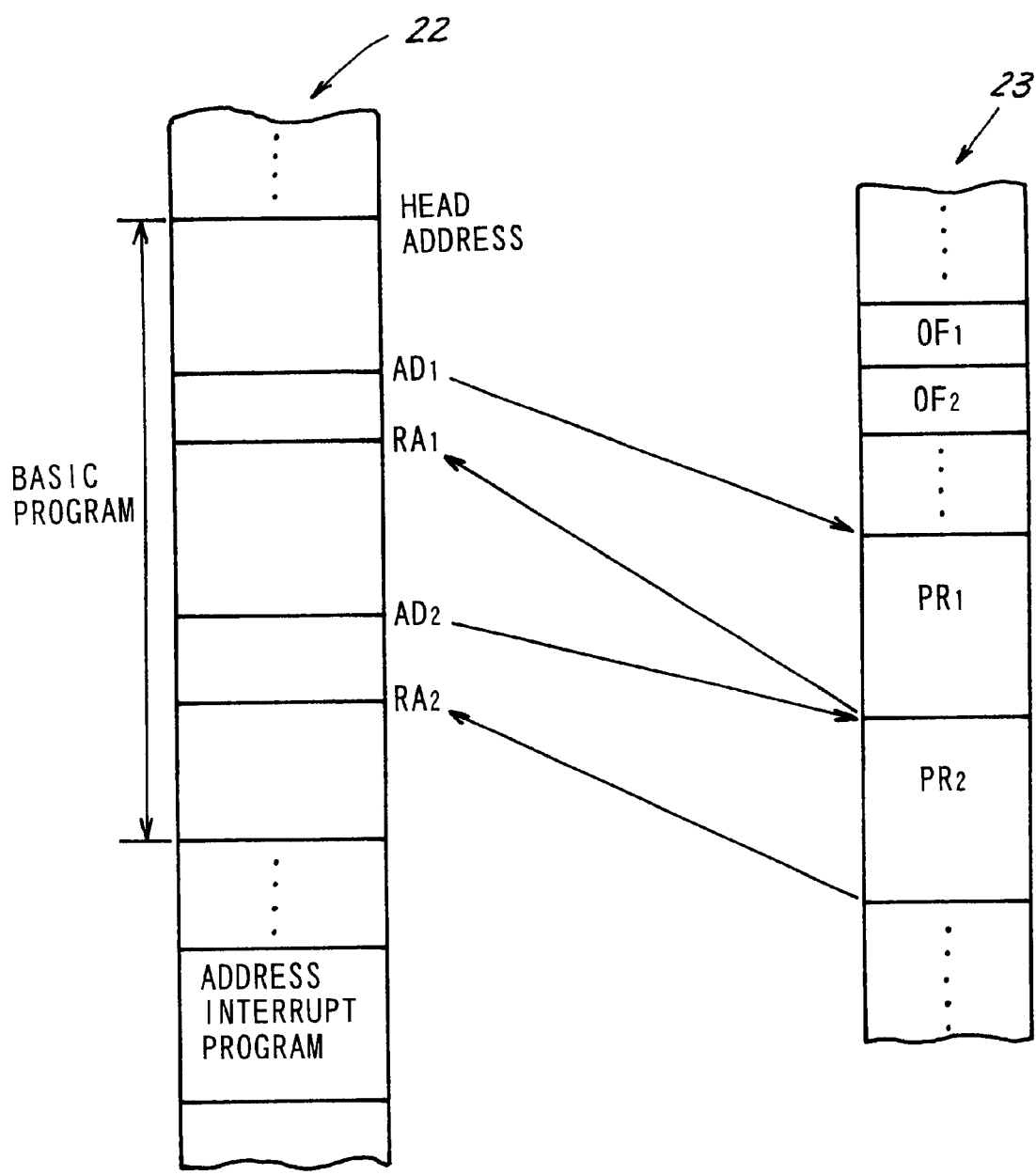
FIG. 5 shows memory maps of a ROM and the RAM to illustrate the operation of the CPU which modifies a basic program in the ROM by the modification programs in the RAM while executing the basic program.

FIG. 5 shows the operation of the CPU 21 when the unit modifies the basic program by the modification programs of the RAM 23 while executing the basic program in the ROM 22. The CPU 21 executes the basic program first at the head address and then from address to address. Upon the execution of the basic program proceeding to the first modification starting address $AD_1$, an address interrupt by the starting address $AD_1$ occurs, and the foregoing address interrupt program (see FIG. 4) stored in the ROM 22 is executed. This program causes the basic program being executed to jump to the head address of the program storage 41 in the RAM 23, whereby the first modification program $PR_1$ is executed instead of the basic program.

When the first modification program $PR_1$ is executed to the last address, a command for a jump to the first return address $RA_1$ contained in the last address is executed, and the modification program being executed jumps to the first return address $RA_1$ of the basic program in the ROM 22. Execution of the basic address is then resumed at the first return address $RA_1$.

When the execution of the basic program proceeds to the second modification starting address $AD_2$, an address interrupt by the starting address $AD_2$ occurs, and the address interrupt program stored in the ROM 22 is executed. This program causes the basic program being executed to jump to the head address of the second modification program code $PR_2$ stored in the program storage 41 in the RAM 23, with reference to the first offset address $OF_1$ stored in the offset storage 40 in the RAM 23. Consequently, the second modification program $PR_2$ is executed instead of the basic program.

When the execution of the second modification program $PR_2$ proceeds to the last address, a command for a jump to the second return address $RA_2$ contained in the last address is executed, whereby the modification program being executed is caused to jump to the second return address $RA_2$ of the basic program in the ROM 22. The execution of the basic program is thus resumed at the second return address $RA_2$.

Accordingly, the basic program is executed, with the portion between the first modification starting address $AD_1$ and the first return address $RA_1$ replaced by the first modification program code $PR_1$, and with the portion between the second modification starting address $AD_2$ and the second return address $RA_2$ replaced by the second modification program code $PR_2$.

The method of modifying the basic program according to the present embodiment merely utilizes the CPU 21 having an address interrupt function, has no need to incorporate into the microcomputer 20 an additional device for modifying the basic program, and is therefore unlikely to make the microcomputer 20 greater in size.

Since the basic program is modified by address interrupt processing, there is no need for the CPU 21 to refer to the modifying addresses at all times. This obviates the likelihood of impairing the processing ability of the microcomputer 20.

The nonvolatile memory 15 has stored therein the modification programs and items of data related thereto as arranged in the modification program storage 30 from the head portion thereof, and of these programs and data, the identification code $ID_i$ is stored first to indicate the presence or absence of the modification program. Accordingly, in the transfer program (see FIG. 3) for transferring the modification program from the nonvolatile memory 15 to the RAM 23, if the j-th identification code $ID_j$ (wherein j is an integer of not smaller than 1) indicates that the j-th modification program is not stored, this indicates that no modification program subsequent to the j-th is stored either, so that the transfer program can be terminated immediately. This eliminates a useless program execution operation.

Method of Modifying Basic Data

The basic data includes servo characteristics of the disk player 10, which will be modified by the method to be described below. The disk player 10 has incorporated therein various servomotors and servo circuits so that a row of items of data recorded on the recording disk can be traced by a read head accurately at a predetermined speed and read from the disk. The servomotors and servo circuits are controlled by an analog method or digital method. In the case of the digital method, the servo characteristics are stored in the microcomputer 20 as parameters. Of these parameters, those which differ from product to product individually are stored in the nonvolatile memory 15, while those which are common to the products are stored in the ROM 22 as basic data. Accordingly, there is the problem that the basic data stored in the ROM 22 can not be modified.

Figure 6:
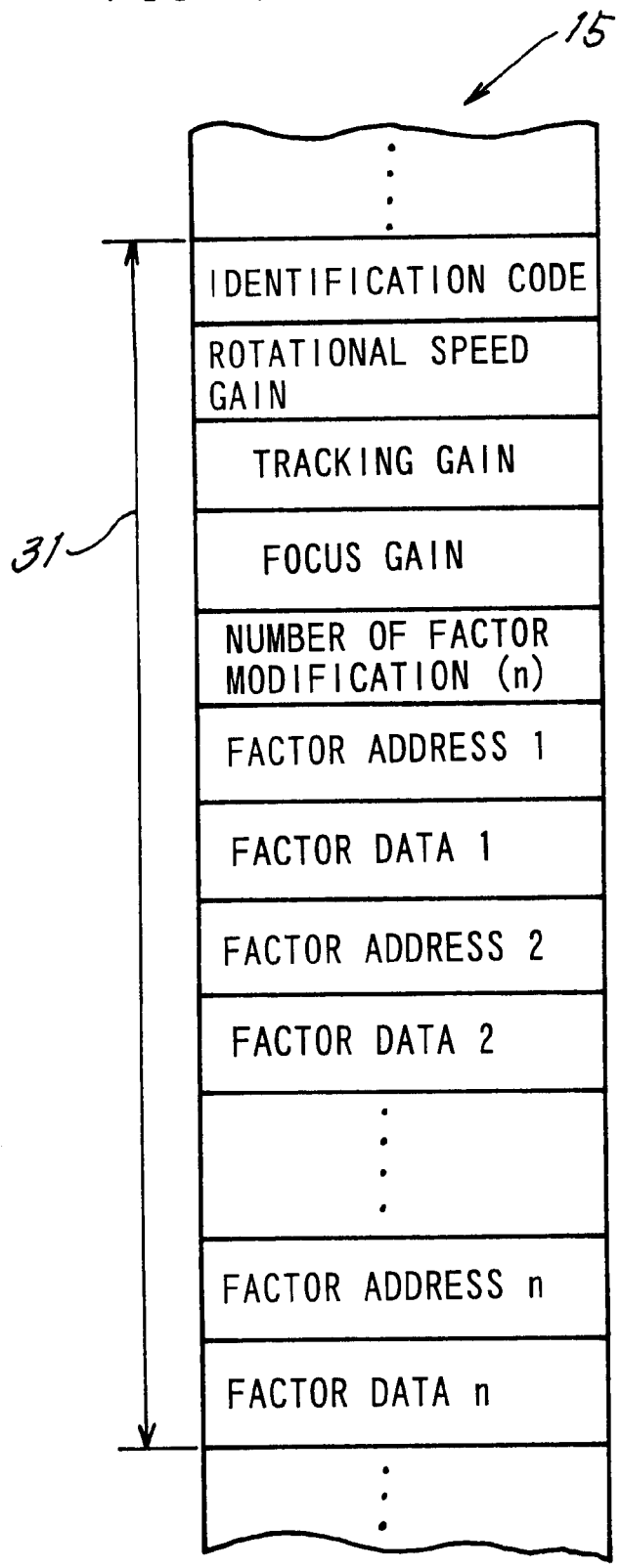
FIG. 6 is a block diagram showing a modified basic data (hereinafter referred to as "modified data") related to servo characteristics stored in the nonvolatile memory.

FIG. 6 shows modified data related to the servo characteristics and stored in the nonvolatile memory 15. The items of modified data are stored in a modified data storage 31 of the nonvolatile memory 15 in a predetermined order. Stored in the illustrated storage 31 are an identification code indicating whether the modified data exits, rotational speed gain for rotation servo, tracking gain for tracking servo, focus gain for focus servo and filter factors of digital filter for determining the servo characteristics. A plurality of filter factors are usually used for the digital filter, so that according to the present embodiment, the storage 31 has stored therein the number of filter factors stored, a factor address specifying each of the filter factors to be modified and the data of the factor.

Figure 7:
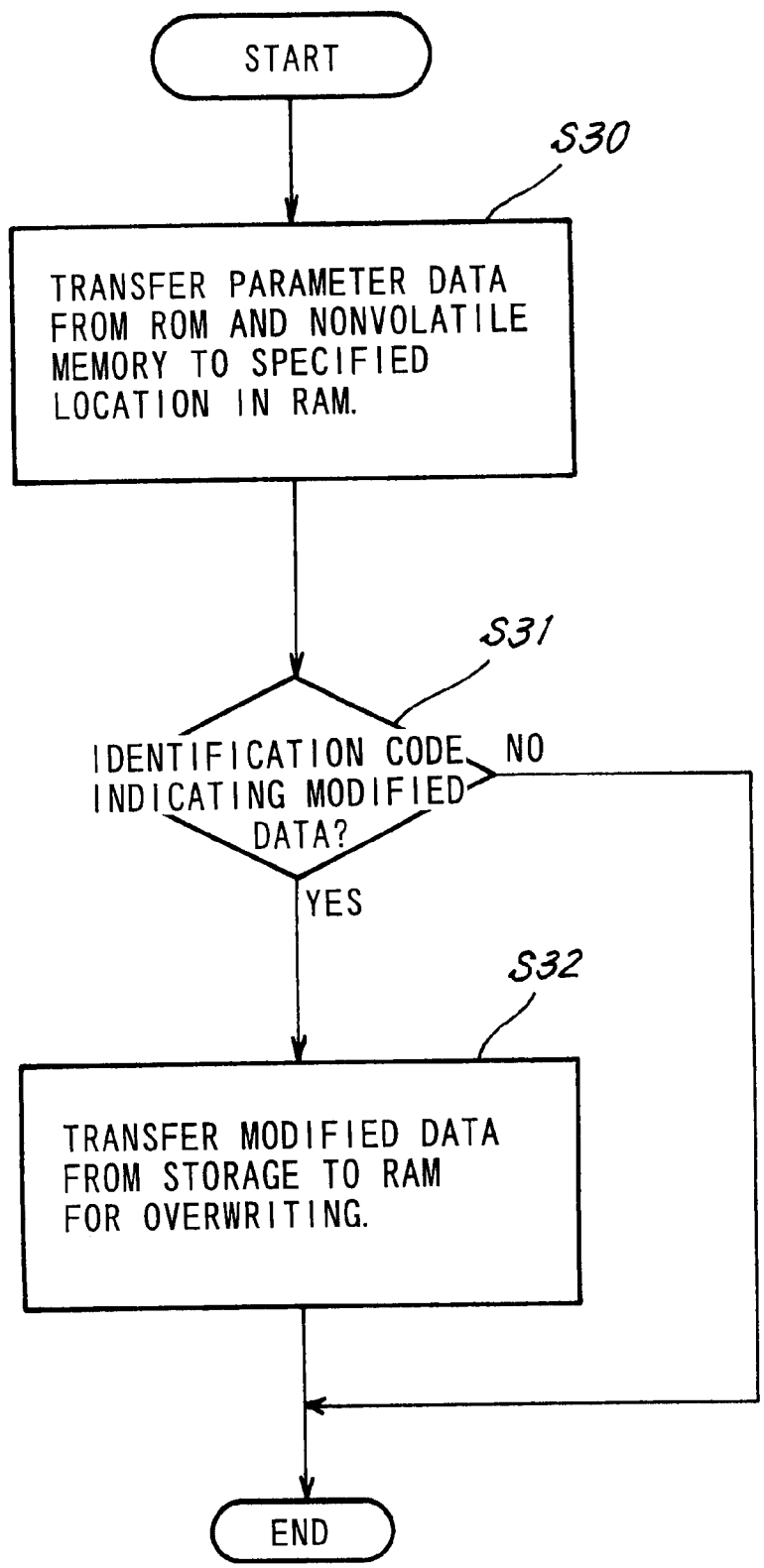
FIG. 7 is a flow chart showing a transfer program transferring parameter data from the nonvolatile memory and the ROM to the RAM by the CPU.

The parameters are transferred to a specified location in the RAM 23 when the system is stated up and read from the RAM 23 for use in recording or playback. FIG. 7 is a flow chart showing the transfer program to be executed by the CPU 21 for transferring the parameter data from the nonvolatile memory 15 and the ROM 22 to the RAM 23. This transfer program is contained in the basic program.

First, the original parameter data is read from the ROM 22 and the nonvolatile memory 15 and transferred to the specified location in the RAM 23 (S30).

Next, the identification code is read from the modified data storage 31 of the nonvolatile memory 15 and checked as to whether modified data is stored (S31). If no modified data is stored, the transfer program is terminated. When the data is stored, each item of modified data is transferred from the storage to the corresponding location on the RAM 23 to overwrite the original parameter data (S32), whereupon the transfer program is terminated.

For recording or playback, therefore, the modified parameter data is read from the RAM 23 and used. Thus, according to the present embodiment, the basic program stored in the ROM 22 can be modified, and the basic data can also be modified.

In the case of the disk player 10 embodying the invention, one modification program $PR_1$ and the data related thereto are about tens of bytes in the quantity of data, and one item of modified data is ten-odd bytes in quantity. Further several portions of the basic program are modified by the modification programs, and several items of the basic data are modified by the modified data. Accordingly, the modification program $PR_i$, data related thereto and modified data can be stored in the remaining capacity (about 150 bytes) of the nonvolatile memory 15 which is used for storing the parameters needed for the operation of the disk player 10. This eliminates the need for an additional memory device, obviating the likelihood of rendering the player 10 greater in size.

Method of Writing Modification Program and Modified Data

Figure 8:
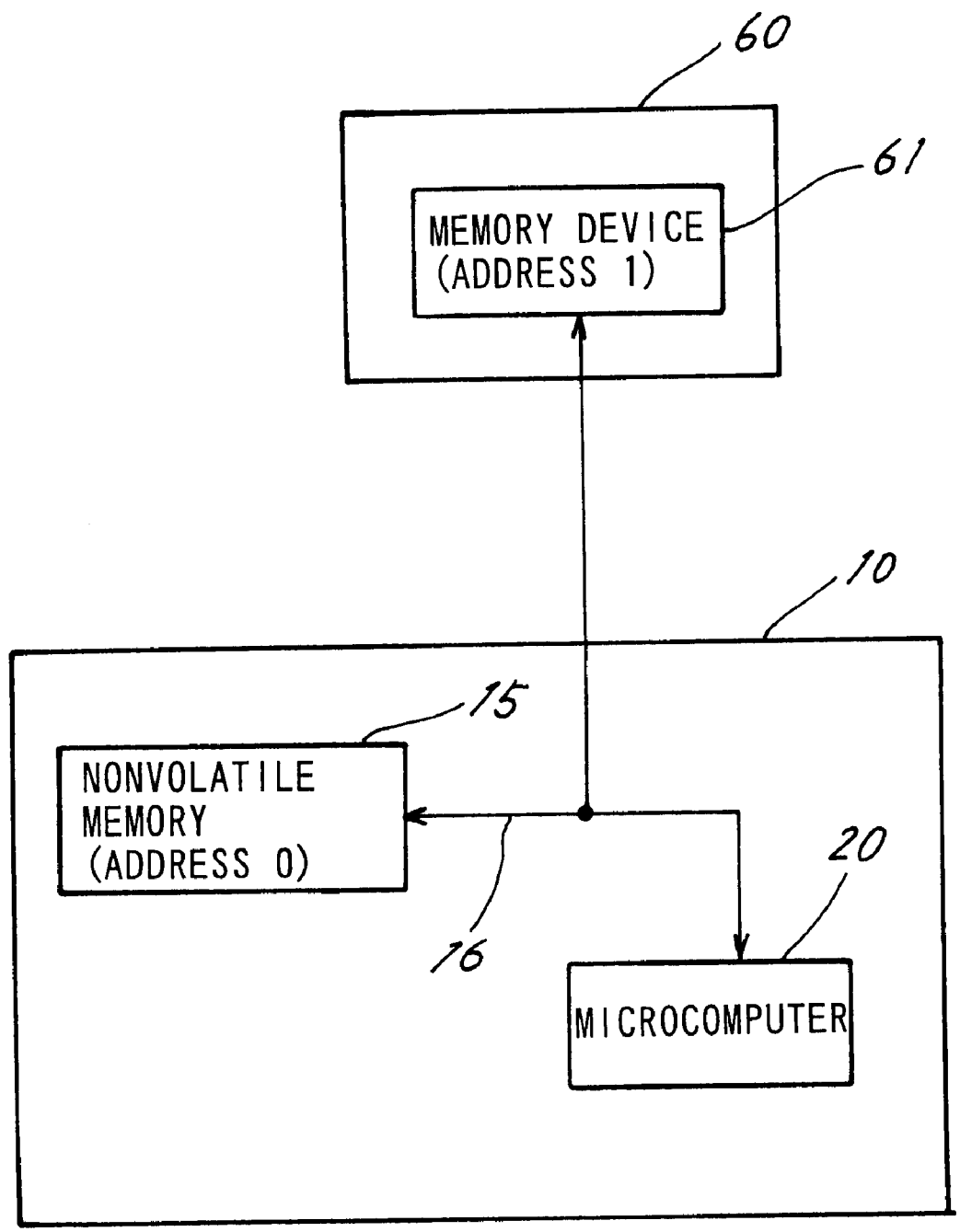
FIG. 8 is a block diagram showing a jig, as connected to the disk player, for use in writing specified data to the nonvolatile memory in the disk player.
Figure 9:
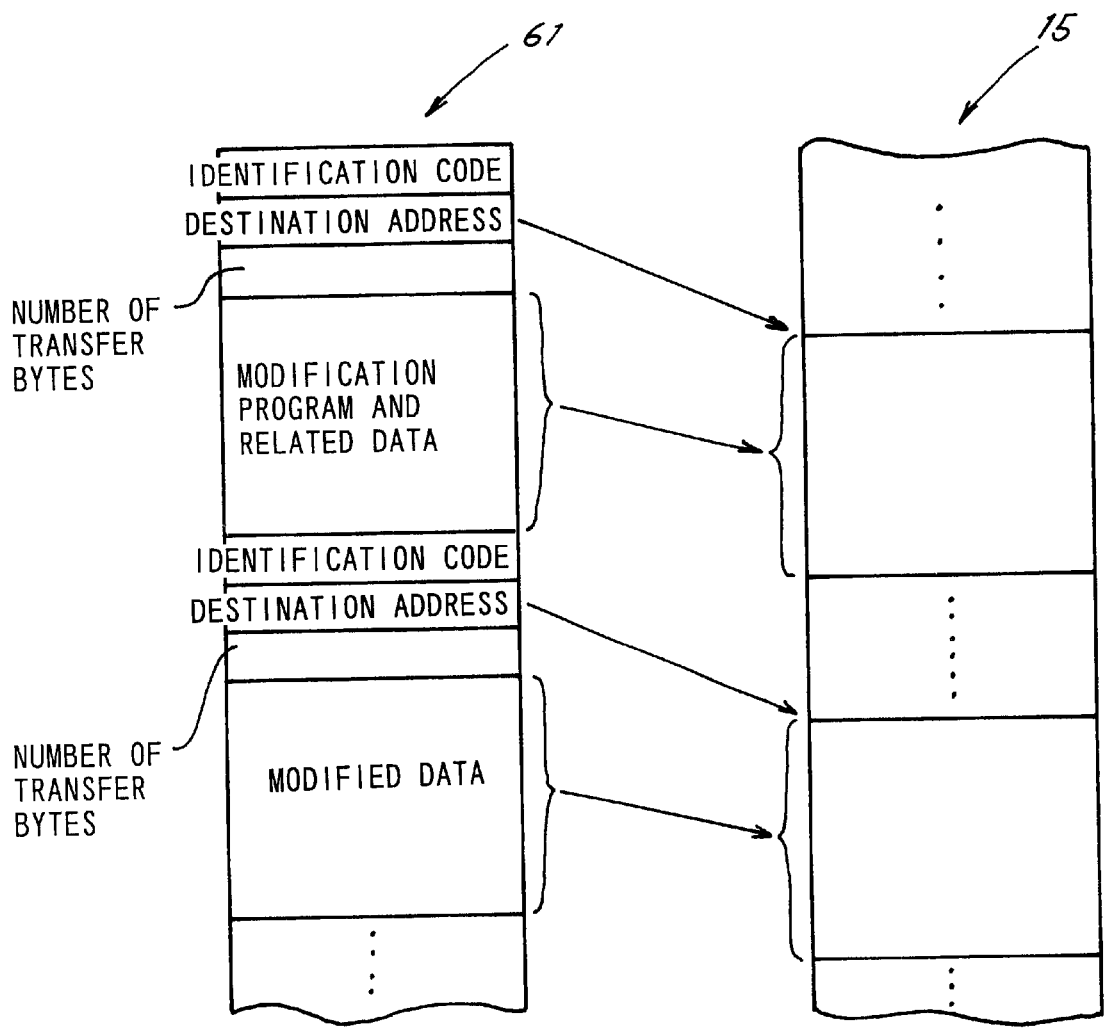
FIG. 9 shows memory maps of a memory device of the jig and the nonvolatile memory to illustrate transfer the modification program, etc. from the memory device of the jig to the nonvolatile memory.
Figure 10:
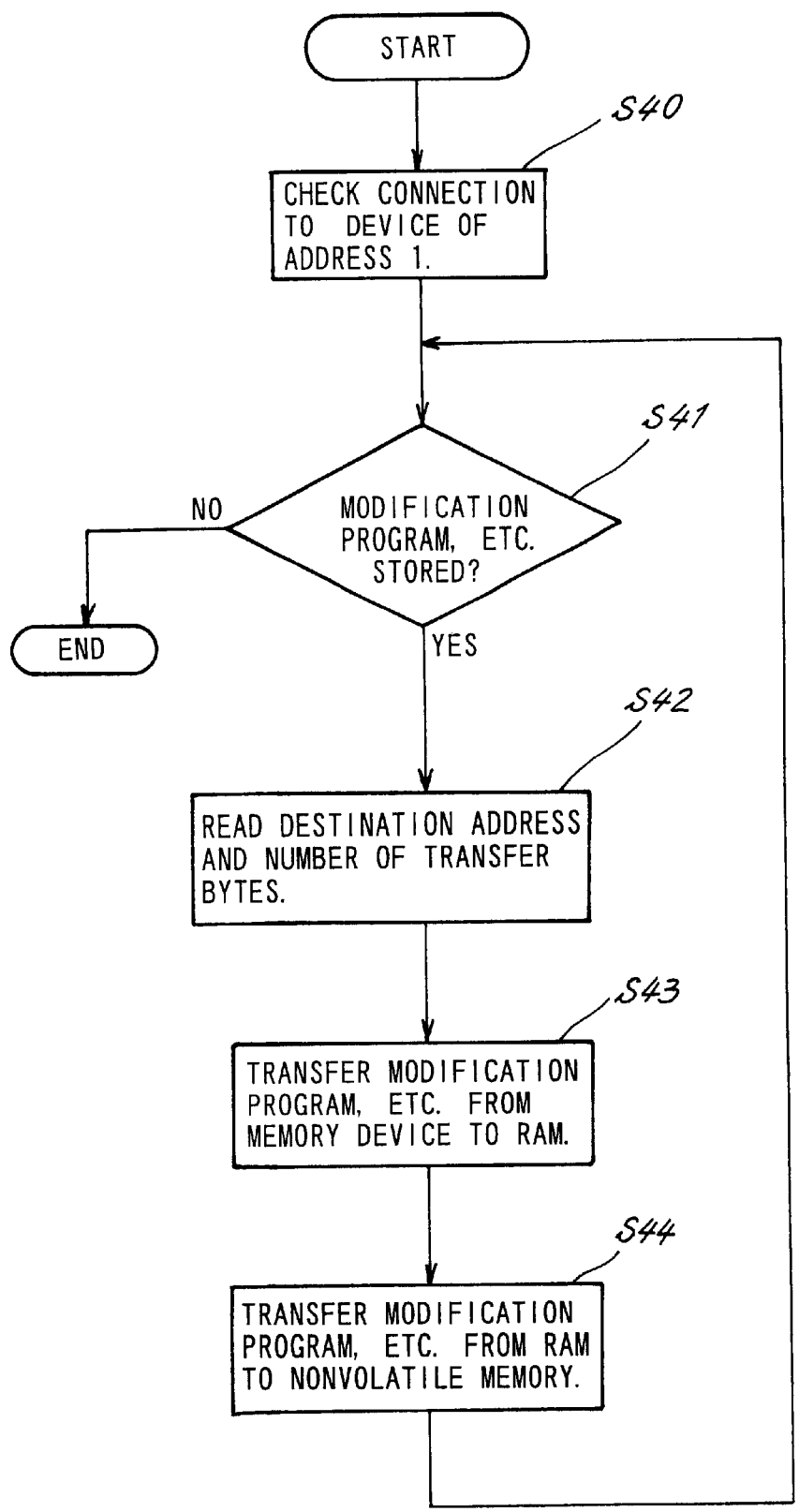
FIG. 10 is a flow chart showing transfer of the modification program, etc. from the jig to the nonvolatile memory under the control of the CPU of the microcomputer.
Figure 11:
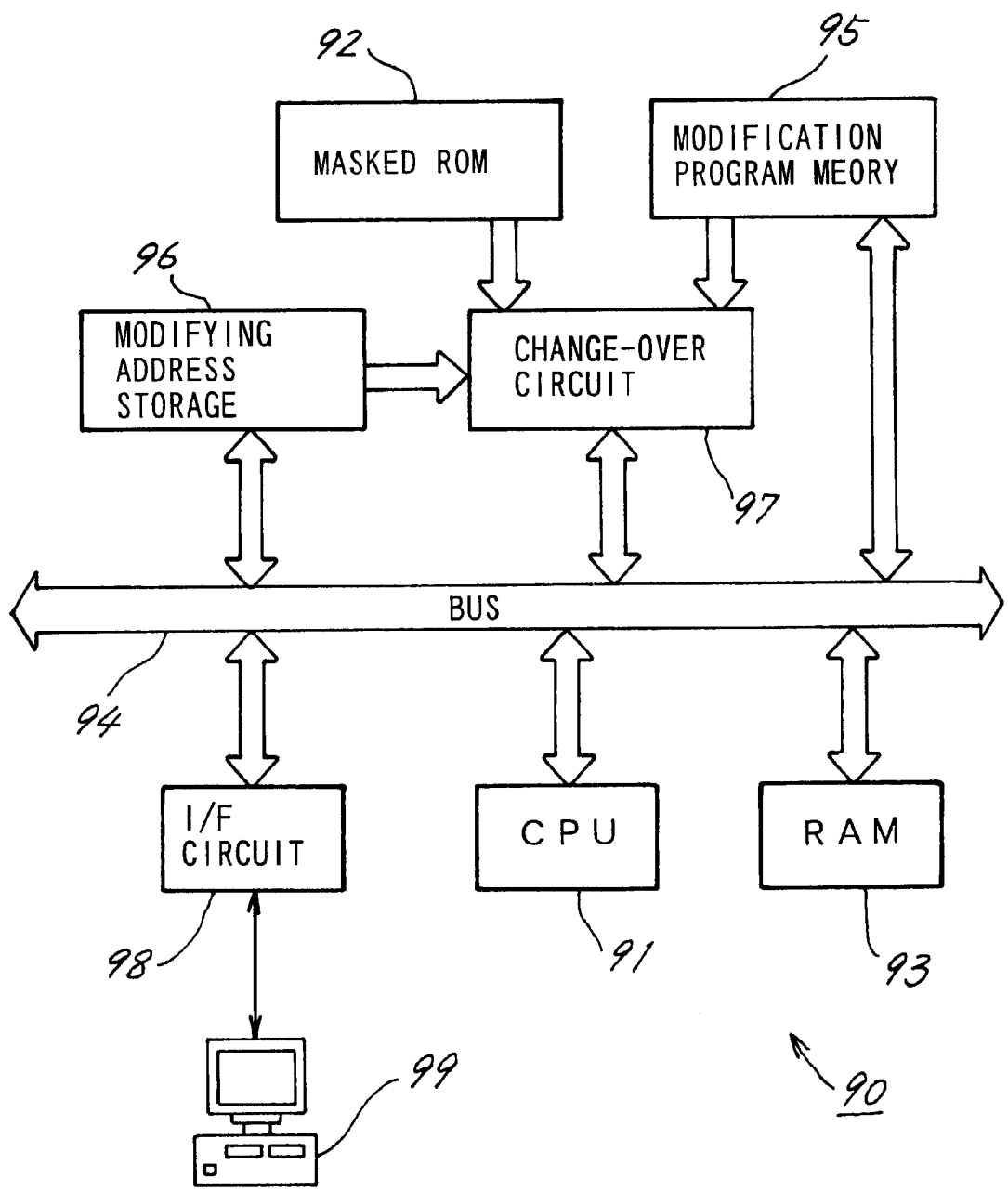
FIG. 11 is a block diagram showing a conventional microcomputer adapted to modify a basic program by a modification program.

With reference to FIGS. 8 to 10, a description will be given of a method of writing the modification programs, data related thereto and modified data (hereinafter referred to as the "modification programs, etc.") to the nonvolatile memory 15.

A jig 60 for use in writing specified data to the nonvolatile memory 15 includes a memory device 61, which has stored therein the modification programs, etc. to be written to the memory 15. When the modification programs, etc. are to be written to the memory 15, the jig 60 is connected to a communication bus 16 interconnecting the microcomputer 20 and the memory 15 as shown in FIG. 8. While a bus of desired type is usable as the communication bus 16, a serial bus such as $I^2C$ bus is used in the present embodiment. Different device addresses are assigned to the memory device 61 of the jig 60 and the nonvolatile memory 15 for the identification of each. In the illustrated case, the device address of the memory 15 is 0, and that of the memory device 61 is 1.

FIG. 9 shows the modification program, etc. stored in the memory device 61 of the jig 60 and to be written to the nonvolatile memory 15. Stored in the memory device 61 of the jig 60 as arranged from the head location therein are an identification code indicating the presence or absence of the modification program and data related thereto, a destination address showing the head address of the modification program storage 30 in the memory 15, the number of transfer bytes which is the number of bytes of the modification program and data related thereto, and a code of the modification programs and data related thereto. Subsequently stored in the memory device 61 are an identification code indicating the presence or absence of the modified data, a destination address indicating the head address of the modified data storage 31 in the nonvolatile memory 15, the number of transfer bytes which is the number of bytes of the modified data, and a code of the modified data.

FIG. 10 is a flow chart showing the write program to be executed by the CPU 21 in the microcomputer 20 for transferring the modification programs, etc. from the jig 60 to the nonvolatile memory 15. This write program is contained in the basic program and executed before the product is shipped. The parameters which are different from product to product individually are written to the memory 15 at the same time. This will not add to the number of steps and is therefore desirable.

First, a command to call up the device address 1 is transmitted to check whether the device of device address 1 (memory device 61 of the jig 60) is connected to the microcomputer (S40). Next, the modification program identification code is read from the memory device 61 to inquire whether the modification program, etc. are stored (S41). If the answer is negative, the write program is terminated. When the answer is affirmative, the destination address and the number of transfer bytes to be transferred to the nonvolatile memory 15 are read from the device 61 (S42). The modification program, etc. of the byte number are transferred from the jig 60 to the RAM 23 in the microcomputer 20 (S43) and then to the memory 15 successively, first at the transfer address (S44), whereupon the sequence returns to step S41.

The operation of the CPU for executing the write program will be described more specifically with reference to FIG. 9.

First, the jig 60 is checked for connection to the microcomputer 20, and the code for identifying the modification program and related data is read from the device 61. Since the identification code indicates that the program and related data are stored, the head address of the modification program storage 30 of the memory 15 and the byte number of the program and related data are read, and the code of the modification program and related data is transferred to the RAM 23. The program and related data on the RAM 23 are then successively written to the modification program storage 30 first at the head address.

The code identifying the modified data is subsequently read. Since this code indicates that the modified data is stored, the head address of the modified data storage 31 of the nonvolatile memory 15 and the byte number of the data are read, and the code of the modified data is transferred to the RAM 23. The modified data code on the RAM 23 is thereafter written to the storage 31 in order, first at the head address, whereupon the write program is terminated. In this way, the modification programs and the data related thereto are stored in the modification program storage 30 of the nonvolatile memory 15, and the modified data in the modified data storage 31 thereof.

The communication bus 16 interconnecting the microcomputer 20 and the nonvolatile memory 15 in the present embodiment comprises several bus lines. Accordingly, the jig 60 is connectable to the bus 16 by bringing connection terminals extending from the jig 60 into contact with respective bus lines. The disk player 10 therefore need not be provided with a specific connector.

Furthermore, the modification programs, etc. are transferred from the jig 60 to the nonvolatile memory 15 under the control of the microcomputer 20 according to the present invention, so that the jig 60 need not be provided with particular control means for the transfer of data. The jig 60 can therefore be provided by the memory device 61 only.

The embodiment described above is intended to illustrate the present invention and should not be construed as restricting the invention defined in the appended claims or reducing the scope thereof. The system of the invention is not limited to the foregoing embodiment in construction but can of course be modified variously within the technical scope set forth in the claims.

What is claimed is:

1. A computer system comprising a microcomputer and external memory means in communication with the microcomputer for storing various programs and various items of data, the microcomputer comprising a nonerasable ROM having stored therein a basic program and basic data for controlling the operation of the computer system, a RAM for storing various programs or various kinds of data, a CPU for executing programs and processing data, and an interface circuit for providing communications with external devices, the computer system being characterized in that:

the external memory means has stored therein a modification program serving as program data for modifying a portion of program data contained in the basic program, a modification starting address indicating a location in the basic program where the modification of the basic program by the modification program is to be started, and a code offset indicating the code length of the modification program, the CPU having an address interrupt function for processing an interrupt at a predetermined interrupt address, the microcomputer comprising read means for reading the modification program and the modification starting address from the external memory means, transferring the modification program and the code offset to the RAM and storing the modification starting address in the CPU as the interrupt address, and means for making reference to the code offset, specifying a head address of the modification program in the RAM, and executing a command to jump to the head address for an address interrupt, wherein the external memory means has stored therein modified data for modifying the basic data, and the microcomputer comprises means for transferring the basic data from the ROM to a predetermined location in the RAM, and substitution means for reading the modified data from the external memory means and transferring the modified data to the predetermined location in the RAM to substitute the modified data for the basic data.

2. A computer system according to claim 1 wherein the external memory means stores an identification code indicating whether the modification program exits, and the read means operates with reference to the identification code.

3. A computer system according to claim 1 which comprises a jig connected to a communication bus for holding the external memory means in communication with the microcomputer and usable for writing specified data to the external memory means, the jig comprising a memory device for storing the modification program and data related thereto, the microcomputer comprising write means for retrieving the modification program and the related data from the memory device and writing the same program and data to the external memory means via the communication bus.

4. A computer system according to claim 3 wherein the communication bus for holding the external memory means in communication with the microcomputer is a serial bus.

5. A computer system according to claim 1 wherein the external memory means stores an identification code indicating whether the modified data exits, and the substitution means operates with reference to the identification code.

6. A computer system according to claim 1 which comprises a jig connected to a communication bus for holding the external memory means in communication with the microcomputer and usable for writing specified data to the external memory means, the jig comprising a memory device for storing the modified data, the microcomputer comprising write means for retrieving the modified data from the memory device and writing the modified data to the external memory means via the communication bus.

7. A computer system according to claim 6 wherein the communication bus for holding the external memory means in communication with the microcomputer is a serial bus.

8. A computer system according to claim 1 wherein the external memory means is an erasable nonvolatile memory such as EEPROM.

9. A computer system according to claim 1 which is a disk player.

10. In a computer system comprising a microcomputer and external memory means in communication with the microcomputer for storing various programs and various items of data, the microcomputer comprising a nonerasable ROM having stored therein a basic program and basic data for controlling the operation of the computer system, a RAM for storing various programs or various kinds of data, a CPU for executing programs and processing data, and an interface circuit for providing communications with external devices, the external memory means having stored therein a modification program serving as program data for modifying a portion of program data contained in the basic program, a modification starting address indicating a location in the basic program where the modification of the basic program by the modification program is to be started, and a code offset indicating the code length of the modification program, the CPU having an address interrupt function for processing an interrupt at a predetermined interrupt address, a method of modifying the basic program including:

the reading step of reading the modification program and the modification starting address from the external memory means, transferring the modification program and the code offset to the RAM and storing the modification starting address in the CPU as the interrupt address, and the step of making reference to the code offset, specifying a head address of the modification program in the RAM, and executing a command to jump to the head address for an address interrupt, wherein the external memory means has stored therein modified data for modifying the basic data, and which includes the step of transferring the basic data from the ROM to a predetermined location in the RAM, and the step of substituting the modified data for the basic data by transferring the modified data from the external memory means to the predetermined location in the RAM.

11. A method of modifying the basic program in a computer system according to claim 10 wherein the external memory means stores an identification code indicating whether the modification program exits, and the reading step is practiced with reference to the identification code.

12. A method of modifying the basic program in a computer system according to claim 10 wherein the computer system comprises a jig connected to a communication bus for holding the external memory means in communication with the microcomputer and usable for writing specified data to the external memory means, the jig comprising a memory device for storing the modification program and data related thereto, the method including the writing step of retrieving the modification program and the related data from the memory device and writing the same program and data to the external memory means via the communication bus.

13. A method of modifying the basic program in a computer system according to claim 10 wherein the external memory means stores an identification code indicating whether the modified data exits, and the substituting step is practiced with reference to the identification code.

14. A method of modifying the basic program in a computer system according to claim 10 wherein the computer system comprises a jig connected to a communication bus for holding the external memory means in communication with the microcomputer and usable for writing specified data to the external memory means, the jig comprising a memory device for storing the modified data, the method comprising the writing step of retrieving the modified data from the memory device and writing the modified data to the external memory means via the communication bus.

15. A method of modifying the basic program in a computer system according to claim 10 wherein the computer system is a disk player.

* * * * *